US011386365B2

(12) United States Patent
Sachdev et al.

(10) Patent No.: US 11,386,365 B2
(45) Date of Patent: Jul. 12, 2022

(54) EFFICIENT PERCENTILE ESTIMATION FOR APPLICANT RANKINGS

(71) Applicant: Microsoft Technology Licensing, LLC, Redmond, WA (US)

(72) Inventors: Sanjay Sachdev, San Jose, CA (US); Arjun K. Kulothungun, San Francisco, CA (US); Rohan Ramanath, Saratoga, CA (US); Deepak Dileep Kumar, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 348 days.

(21) Appl. No.: 16/144,012

(22) Filed: Sep. 27, 2018

(65) Prior Publication Data

US 2020/0104780 A1    Apr. 2, 2020

(51) Int. Cl.
| | |
|---|---|
| *G06F 16/20* | (2019.01) |
| *G06Q 10/06* | (2012.01) |
| *G06N 20/00* | (2019.01) |
| *G06F 16/9535* | (2019.01) |
| *G06F 16/903* | (2019.01) |

(52) U.S. Cl.
CPC ........ *G06Q 10/063112* (2013.01); *G06F 16/90335* (2019.01); *G06F 16/9535* (2019.01); *G06N 20/00* (2019.01)

(58) Field of Classification Search
CPC ....... G06Q 10/063112; G06F 16/90335; G06F 16/9535; G06N 20/00
See application file for complete search history.

(56) References Cited

U.S. PATENT DOCUMENTS 8,412,699 B1 *    4/2013    Mukherjee .......... G06F 16/2425
                                                                 707/713

OTHER PUBLICATIONS

Messing, Opportunity Recognition & Analysis [date unknown], Kent State University, https://www.csuohio.edu/sites/default/files/EIW_Lecture_3_Opportunity%20Analysis_Messing.pdf.*
Ebben, What Makes a Good Opportunity? Oct. 1, 2004, inc.com, https://www.inc.com/resources/startup/articles/20041001/oppty.html.*
Antonov, QuantileRegression.m Aug. 1, 2007, github.com, https://github.com/antononcube/MathematicaForPrediction/blob/b8cefec509b4671e2ea4b6b4c9c0acc02c04f610/QuantileRegression.m.*
Antonov, Finding local extrema in noisy data using Quantile Regression Sep. 27, 2015, wordpress.com, https://mathematicaforprediction.wordpress.com/2015/09/27/finding-local-extrema-in-noisy-data-using-quantile-regression/.*
Mathematica Quick Revision History [date unknown], wolfram.com, https://www.wolfram.com/mathematica/quick-revision-history.html.*

(Continued)

*Primary Examiner* — Tarek Chbouki
(74) *Attorney, Agent, or Firm* — Schwegman Lundberg & Woessner, P.A.

(57) ABSTRACT

The disclosed embodiments provide a system for processing a query for a ranking of candidates for an opportunity. During operation, the system obtains parameters associated with a query for a ranking of candidates for an opportunity, wherein the parameters include a candidate and the opportunity. Next, the system matches one or more of the parameters to a fixed number of quantile thresholds calculated from a distribution of scores for the candidates. The system then estimates, based on the fixed number of quantile thresholds, a quantile for a score of the candidate. Finally, the system outputs a position of the candidate within the ranking based on the estimated quantile.

18 Claims, 5 Drawing Sheets

(56) References Cited

OTHER PUBLICATIONS

Quantile [date unknown], wolfram.com, 6.0, https://reference.wolfram.com/language/ref/Quantile.html?view=all.*

PredictorFunction [date unknown; captured by archive.org on Aug. 15, 2014], wolfram.com, 10.0, https://web.archive.org/web/20140815185626/https://reference.wolfram.com/language/ref/PredictorFunction.html.*

Hoiles, Engagement dynamics and sensitivity analysis of YouTube videos Nov. 2, 2016, arXiv, https://arxiv.org/pdf/1611.00687.pdf.*

Antonov, Quantile Regression—Theory, Implementations, and Applications [attested to as Oct. 22-24, 2014 by https://blog.wolfram.com/2014/06/17/wolfram-technology-conference-2014-register-now/], wolframalpha.com, https://www.wolfram.com/broadcast/video.php?c=377&p=2&v=1256).*

Duda et al., Pattern Classification 2000, Wiley, 2nd ed., Chapter 1.*

Predictive Analysis date unknown [captured by archive.org on Apr. 11, 2016], mathworks.com, https://web.archive.org/web/20160411191123/https://www.mathworks.com/discovery/predictive-analytics.html.*

SRI Alumni Association date unknown [captured by archive.org on Jul. 4, 2012], SRI Alumi Association, https://web.archive.org/web/20120704040638/https://www.sri.com/about/alumni/alumni-hall-fame-2008/.*

Quotes for Opportunity date unknown [captured by archive.org on Jan. 4, 2010], motivatingquotes.com, https://web.archive.org/web/20100104010815/https:/www.motivatingquotes.com/opportunity.htm.*

Browlee, How to Use Quantile Transforms for Machine Learning May 20, 2020, machinelearningmastery.com, https://machinelearningmastery.com/quantile-transforms-for-machine-learning/?nowprocket=1.*

Sachdev et al.; U.S. Appl. No. 15/874,127, filed Jan. 18, 2018, entitled "Scalable Processing of Queries for Applicant Rankings".

* cited by examiner

EFFICIENT PERCENTILE ESTIMATION FOR APPLICANT RANKINGS

BACKGROUND

Field

The disclosed embodiments relate to techniques for determining applicant competitiveness for opportunities. More specifically, the disclosed embodiments relate to techniques for performing efficient percentile estimations for applicant rankings.

Related Art

Online networks may include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as online networks that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals may use an online network to locate prospects, maintain a professional image, establish and maintain relationships, and/or engage with other individuals and organizations. Similarly, recruiters may use the online network to search for candidates for job opportunities and/or open positions. At the same time, job seekers may use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for performing efficient percentile estimations for applicant rankings. The applicant rankings may include rankings of candidates for jobs, positions, roles, and/or opportunities. The applicant rankings may also, or instead, include rankings of recommendations of connections, follows, mentorships, referrals, and/or other types of relationships or interactions for members of an online network. Each ranking may be produced by ordering the candidates by descending score from one or more machine learning models. As a result, candidates at or near the top of a ranking may be deemed to be better qualified for the corresponding opportunity and/or recommendation than candidates that are lower in the ranking.

More specifically, the disclosed embodiments utilize quantile thresholds calculated from distributions of scores for a ranking of candidates to estimate a given candidate's position and/or quantile in the ranking. For example, a set of scores outputted by a machine learning model may be associated with a number of fixed quantiles, such as quantiles for the top 5%, 10%, 25%, 50%, and/or 100% of scores. In another example, quantiles may be selected and/or adjusted on a per-model basis and/or based on the usage or distribution of scores for a given opportunity, set of parameters, and/or other criteria.

After the quantiles are selected, score values representing the quantiles are calculated from the distribution of scores in the ranking and used as quantile thresholds for the ranking. An interpolation technique may then be used with the quantile thresholds to estimate the quantile for a candidate's score, and the quantile may be used to determine and/or output the candidate's position in the ranking.

By estimating percentiles and/or quantiles associated with candidate scores from a limited number of quantile thresholds, the disclosed embodiments may reduce computational, storage, and/or network overhead associated with generating the ranking and/or determining a candidate's position in the ranking. In contrast, conventional techniques may calculate, retrieve, and/or transmit a much larger number of scores for some or all candidates in the ranking to determine or calculate a given candidate's position or quantile in the ranking. Consequently, the disclosed embodiments may improve the performance, efficiency, speed, and/or scalability of query-processing technologies, ranking systems, and/or computer systems on which the query-processing technologies and/or ranking systems execute.

Efficient Percentile Estimation for Applicant Rankings

Figure 1:
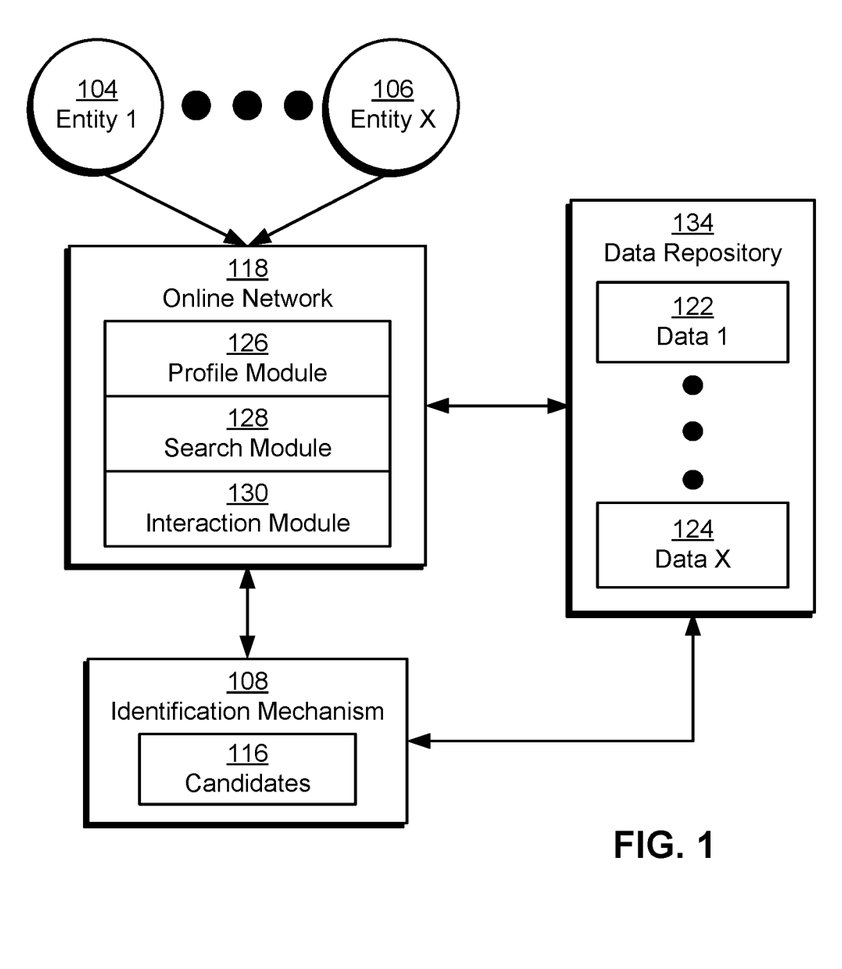
FIG. 1 shows a schematic of a system in accordance with the disclosed embodiments.

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

In turn, data in data repository 134 may be used to generate recommendations and/or other insights related to listings of jobs or opportunities within online professional network 118. For example, one or more components of the online professional network may track searches, clicks, views, text input, conversions, and/or other feedback during the entities' interaction with a job search tool in the online professional network. The feedback may be stored in data repository 134 and used as training data for one or more machine learning models, and the output of the machine learning model(s) may be used to display and/or otherwise recommend a number of job listings to current or potential job seekers in the online professional network.

More specifically, data in data repository 134 and one or more machine learning models are used to produce rankings of candidates 116 for jobs or opportunities listed within or outside online network 118. As shown in FIG. 1, an identification mechanism 108 identifies candidates 116 associated with the opportunities. For example, identification mechanism 108 may identify candidates 116 as users who have viewed, searched for, and/or applied to jobs, positions, roles, and/or opportunities, within or outside online network 118. Identification mechanism 108 may also, or instead, identify candidates 116 as users and/or members of online network 118 with skills, work experience, and/or other attributes or qualifications that match the corresponding jobs, positions, roles, and/or opportunities.

After candidates 116 are identified, profile and/or activity data of candidates 116 may be inputted into the machine learning model(s), along with features and/or characteristics of the corresponding opportunities (e.g., required or desired skills, education, experience, industry, title, etc.). In turn, the machine learning model(s) may output scores representing the strength of candidates 116 with respect to the opportunities and/or qualifications related to the opportunities (e.g., skills, current position, previous positions, overall qualifications, etc.). For example, the machine learning model(s) may generate scores based on similarities between the candidates' profile data with online network 118 and descriptions of the opportunities. The model(s) may further adjust the scores based on social and/or other validation of the candidates' profile data (e.g., endorsements of skills, recommendations, accomplishments, awards, patents, publications, reputation scores, etc.). The rankings may then be generated by ordering candidates 116 by descending score.

In turn, the rankings and/or associated insights may improve the quality of candidates 116 and/or recommendations of opportunities to candidates 116, increase user activity with online network 118, and/or guide the decisions of candidates 116 and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates 116 for a job to encourage the member to apply for jobs in which the member is highly ranked. In a second example, the component(s) may account for a candidate's relative position in rankings for a set of jobs during ordering of the jobs as search results in response to a job search by the candidate. In a third example, a ranking of candidates 116 for a given set of job qualifications may be displayed as search results to a recruiter after the recruiter performs a search with the job qualifications included as parameters of the search.

On the other hand, rankings of candidates 116 may be generated using techniques that incur significant overhead. For example, each request for a ranking of candidates for an opportunity and/or a specific candidate's position in the ranking may require multiple calls to data stores or services that identify candidates for the opportunity, provide features related to the candidates and opportunity, and apply machine learning models to the features to produce a score for each candidate-opportunity pair. The candidates may then be ranked by descending score, and a candidate's position or percentile in the ranking may be calculated based on the ranking. In other words, processing of a query for a candidate's position or percentile in a ranking may involve the calculation and/or retrieval of scores for a large number of other candidates in the ranking, which can require significant computational, storage, and/or network bandwidth.

Figure 2:
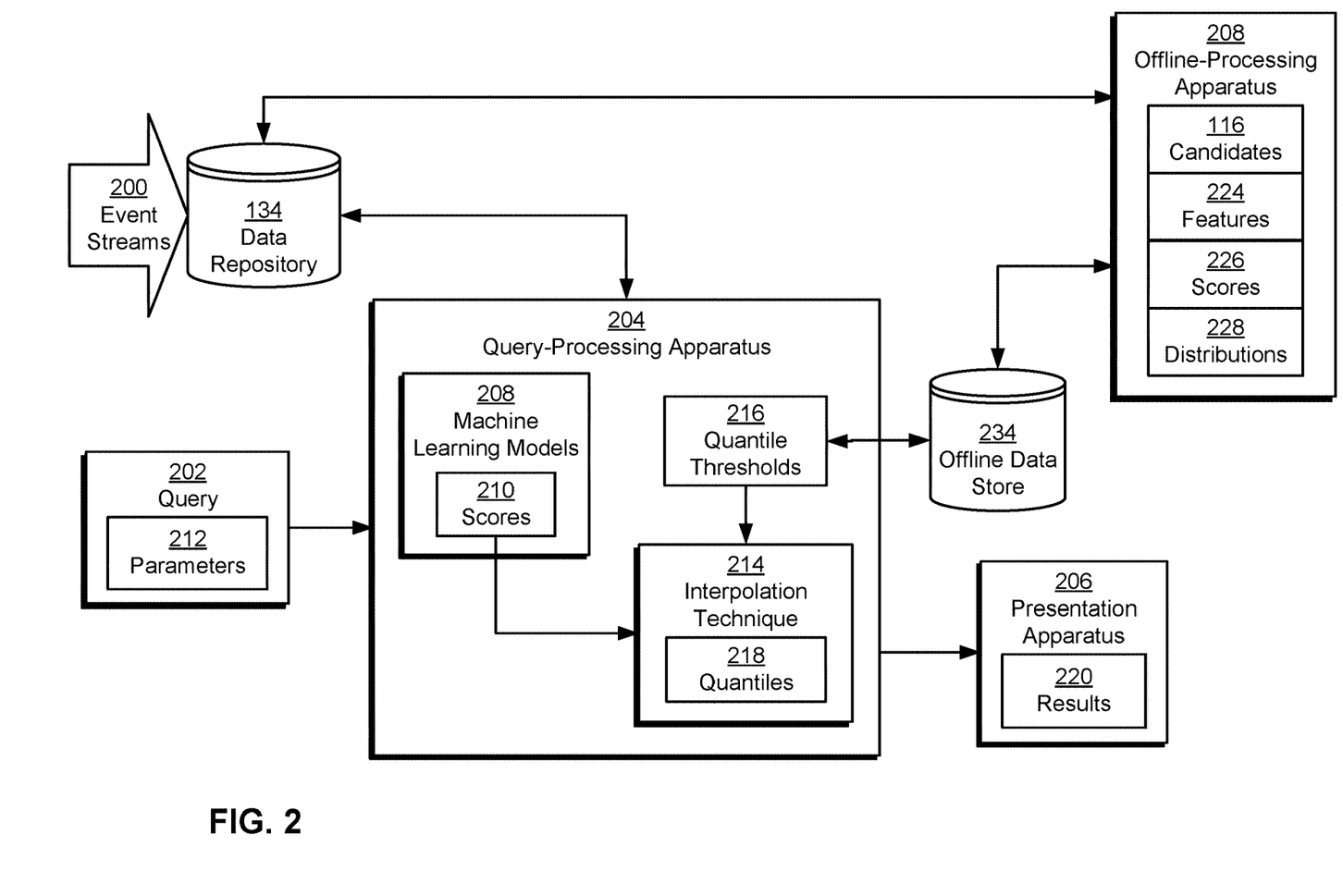
FIG. 2 shows a system for processing a query for a ranking of candidates for an opportunity in accordance with the disclosed embodiments.

In one or more embodiments, one or more components of online network 118 include functionality to efficiently generate rankings of candidates 118 for opportunities and/or determine the position of a candidate in a ranking by estimating the percentile associated with the candidate's score for an opportunity. As shown in FIG. 2, a query 202 related to a ranking of candidates for one or more opportunities is received by a query-processing apparatus 204. For example, query 202 may be used to generate results 220 that include, but are not limited to, scores 210 representing the strength or "fit" of one or more candidates with respect to the opportunities, rankings of the candidates by the scores, and/or percentiles or positions of the candidates in the rankings. As a result, query-processing apparatus 204 may include a service that produces results 220 in a real-time or nearline basis in response to query 202.

Query 202 may be received from one or more components of an online network (e.g., online network 118 of FIG. 1), an employment website or service, and/or another application or service that can be used to search for, view, obtain recommendations for, and/or apply for jobs or opportunities. For example, query 202 may be generated by one or more components for displaying job recommendations, job search results, and/or job listings to users that are candidates for the jobs. In another example, query 202 may be received from components and/or services that are used to evaluate the strengths of the candidates for the jobs. In a third example, query 202 may be received by one or more components for recommending highly qualified candidates to recruiters, hiring managers, human resources professionals, and/or other sourcers or moderators involved in screening for and/or placing jobs, positions, roles, and/or opportunities.

Query 202 may also, or instead, pertain to other types of rankings of candidates. For example, query 202 may be used to generate a ranking of candidates as connection recommendations for a member of the online network. The ranking may be based on scores that are calculated using features or attributes such as connections in common between the member and the candidates and/or overlap in employment or education between the member and the candidates. In another example, query 202 may be used to retrieve a ranking of candidates as potential matches for a relationship or interaction such as dating, travel, an activity, a mentorship, and/or a personal or professional collaboration.

Query 202 includes parameters 212 that are used to generate the corresponding results 220. For example, query 202 may specify parameters 212 such as one or more candidates to be ranked and one or more opportunities by which the candidates are to be ranked. Continuing with the previous example, parameters 212 may additionally identify a ranking category used to rank the candidates for the opportunities, such as skills associated with the opportunities, the previous positions of the candidates, the current positions of the candidates, and/or the candidates' overall qualifications for the opportunities (e.g., a combination of skills, previous positions, current positions, and/or other attributes or qualifications under consideration). Parameters 212 may also, or instead, include thresholds, values, and/or ranges of values for an industry, location, education, skills, past positions, current positions, overall qualifications, title, seniority, keywords, awards, publications, patents, licenses and certifications, and/or other attributes or fields associated with qualifications of the candidates.

During processing of query 202, query-processing apparatus 204 and/or another component of the system may use one or more machine learning models 208 to generate scores 210 for candidates identified in query 202. To generate scores 210, the component may retrieve, from data repository 134, features that include the latest versions of skills, titles, education, work experience, and/or other relevant attributes associated with each candidate and opportunity identified in a query.

Data in data repository 134 may be updated using records of recent activity received over one or more event streams 200. For example, event streams 200 may be generated and/or maintained using a distributed streaming platform such as Apache Kafka (Kafka™ is a registered trademark of the Apache Software Foundation). One or more event streams 200 may also, or instead, be provided by a change data capture (CDC) pipeline that propagates changes to the data from a source of truth for the data. For example, an event containing a record of a recent profile update, job search, job view, job application, response to a job application, connection invitation, post, like, comment, share, and/or other recent member activity within or outside the community may be generated in response to the activity. The record may then be propagated to components subscribing to event streams 200 on a nearline basis.

Query-processing apparatus 204 may then apply logistic regression models, artificial neural networks, tree-based models, ensemble models, and/or other types of machine learning models 208 to the features to calculate scores 210 representing the strength of the candidates with respect to the corresponding opportunities and/or parameters 212. As a result, scores 210 may reflect the latest profile updates and/or user activity from the candidates.

Next, query-processing apparatus 204 obtains a number of quantile thresholds 216 from an offline data store 234. Quantile thresholds 216 may include values that represent specific quantiles in a given ranking or set of previously calculated scores 226, such as a ranking of scores 226 for query 202, opportunity, ranking category, and/or a set of parameters 212. For example, quantile thresholds 216 may include score values that denote fixed percentiles, such as the top 0%, 10%, 20%, 50%, and 100% of scores 226. In another example, quantile thresholds 216 may be selected for individual machine learning models 208 based on the range of values outputted by each machine learning model, the distribution (e.g., distributions 228) of values outputted by each machine learning model, and/or subsequent usage of the values (e.g., identifying candidates that score above a certain percentile, below a certain percentile, and/or within a certain range of percentiles).

An offline-processing apparatus 208 calculates and/or updates quantile thresholds 216 in offline data store 234 on a periodic and/or batch-processing basis. For example, offline-processing apparatus 208 may update quantile thresholds 216 every hour, every four hours, every day, and/or when a pre-specified amount of data that can be used to update quantile thresholds 216 has been received.

First, offline-processing apparatus 208 may retrieve features 224 for candidates 116 from offline data store 234, data repository 134, and/or another data source. As mentioned above, candidates 116 may include users who have viewed the corresponding opportunities, applied to the opportunities, searched for the corresponding opportunities, and/or are otherwise identified as qualified for the opportunities.

Next, offline-processing apparatus 208 may apply one or more machine learning models 208 (i.e., the same machine learning models 208 as those used to perform online scoring of candidates by query-processing apparatus 204) to features 224 to generate scores 226 for the identified candidates 116. For example, each score may represent the strength of a candidate for an opportunity, the likelihood that a candidate receives a response to his/her application for an opportunity, the likelihood that a candidate will be accepted for an opportunity, and/or the likelihood that a candidate receives a connection invitation from a member of an online network after the candidate is outputted as a connection recommendation to the member.

Offline-processing apparatus 208 may then calculate quantile thresholds 216 from distributions 228 of the corresponding scores 226 for a given opportunity, ranking, query, and/or set of parameters 212. For example, offline-processing apparatus 208 may order a set of scores 226 by increasing or decreasing value and use the relative positions of the ordered scores 226 and quantiles selected for quantile thresholds 216 to determine the corresponding quantile thresholds 216.

Finally, offline-processing apparatus 208 may store quantile thresholds 216 with optional metadata in offline data store 234. For example, offline-processing apparatus 208 may store six values associated with a set of quantile thresholds 216 for each ranking and/or set of scores 226 in an array, vector, and/or other structure in offline data store 234. One value may contain the number of scores 226 used to calculate the set of quantile thresholds 216, and the five remaining values may contain scores 226 representing quantile thresholds 216. Calculating and storing quantile thresholds from distributions of scores is described in further detail below with respect to FIGS. 3A-3B.

After quantile thresholds 216 for one or more recently calculated scores 210 are retrieved from offline data store 234, query-processing apparatus 204 applies an interpolation technique 214 to quantile thresholds 216 to estimate quantiles 218 for scores 210. For example, query-processing apparatus 204 may identify two consecutive quantile thresholds 216 between which a score is found and use a linear and/or spline interpolation technique 214 to estimate the score's quantile from the value of the score, the values of the two quantile thresholds 216, and the quantiles represented by the two quantile thresholds 216.

Continuing with the above example, a score may be assigned a $0^{th}$ percentile when the score is lower than the threshold for the $0^{th}$ percentile from quantile thresholds 216. Conversely, the score may be assigned the $100^{th}$ percentile when the score is higher than the threshold for the $100^{th}$ percentile from quantile thresholds 216. If the score is between the values of the $0^{th}$ and $100^{th}$ percentile thresholds, the score's percentile may be estimated using the following operations:

$$\text{find } i \text{ s.t. } s >= S[i] \text{ and } s < S[i-1]$$

$$p = P[i-1] + (P[i] - P[i-1])*(s - S[i-1])/(S[i] - S[i-1])$$

In the above operations, a score "s" is used to identify two consecutive quantile thresholds 216 "S[i]" and "S[i−1]" within which the score lies. Next, the score's percentile "p" is estimated based on the position of the score on the line between "S[i]" and "S[i−1]" and percentiles "P[i]" and "P[i−1]" represented by "S[i]" and "S[i−1]."

The example operations above may be illustrated using an array of scores S=[2, 3, 5, 8, 9, 13] corresponding to percentiles P=[0, 5, 10, 20, 50, and 100]. A score of 6 is identified as falling between the score values of 5 and 8 and the corresponding percentile thresholds of 10 and 20. A percentile "p" for the score is then estimated using the following:

$$p = 10 + (20-10)*(6-8)/(5-8) = 10 + 10*2/3 = 10 + 7 = 17$$

Query-processing apparatus 204 additionally includes functionality to estimate quantiles 218 for recently calculated scores 210 that belong to a ranking or distribution that contains little to no unique quantile thresholds 216. When no other scores (e.g., scores 226) or quantile thresholds 216 exist for a ranking or distribution, a newly calculated score (e.g., scores 210) may be assigned both the $0^{th}$ and $100^{th}$ percentile. When one other score belongs to the same ranking or distribution, a newly calculated score may be assigned to the top $50^{th}$ percentile when the newly calculated score is higher than the other score and to the bottom $50^{th}$ percentile when the newly calculated score is lower than the other score.

When two scores are used to generate quantile thresholds 216 for a ranking, the higher score is assigned to the top $0^{th}$ percentile and the lower score is assigned to the top $100^{th}$ percentile. When a newly calculated score falls between the lower and higher scores, the quantile of the newly calculated score is linearly interpolated using the two scores and the corresponding percentiles.

When three scores are used to generate quantile thresholds 216 for a ranking, the highest score is assigned to the top $0^{th}$ percentile, the middle score is assigned to the $50^{th}$ percentile, and the lowest score is assigned to the top $100^{th}$ percentile. The quantile of a newly calculated score that falls between the lowest and highest scores is then estimated by linearly interpolating between the two consecutive percentile thresholds that bound the score.

After quantiles 218 are estimated for one or more scores 210 generated in response to parameters 212 of a given query, query-processing apparatus 204 uses scores 210 and/or quantiles 218 to generate one or more results 220 of query 202. For example, query-processing apparatus 204 may generate a ranking for query 202 by ordering candidates identified in query 202 by ascending or descending scores 210 and/or quantiles 218. In another example, query-processing apparatus 204 may estimate a candidate's numeric position in a ranking by multiplying the estimated quantile for the candidate's score by the total number of candidates in the ranking.

Results 220 are then outputted by a presentation apparatus 206. For example, presentation apparatus 206 may include one or more frontend components and/or batch-processing jobs that generate multiple variations of query 202 in response to activity from job seekers and/or other users identified as candidates for the opportunities. Presentation apparatus 206 may obtain results 220 from query-processing apparatus 204 and include insights related to results 220 (e.g., "You'd be in the top 10% of 232 applicants for this job," "You'd be in the top 5 applicants for this job," "This member is in the top 25% of candidates for this position," etc.) in recommendations, search results, job listings, and/or other output associated with the opportunities. The output may be included in emails, notifications, user-interface elements, tables, files, visualizations, and/or other mechanisms for communicating or interacting with the candidates.

By estimating quantiles and/or rankings associated with candidate scores from a limited or fixed number of quantile thresholds, the system of FIG. 2 may reduce computational, storage, and/or network overhead associated with generating rankings of candidates and/or determining a candidate's position in a given ranking. In contrast, conventional techniques may calculate, retrieve, and/or transmit a much larger number of scores for some or all candidates in a ranking before determining one candidate's position or quantile in the ranking. Consequently, the disclosed embodiments may improve the performance, efficiency, speed, and/or scalability of query-processing technologies, ranking systems, and/or computer systems on which the query-processing technologies and/or ranking systems execute.

Those skilled in the art will appreciate that the system of FIG. 2 may be implemented in a variety of ways. First, query-processing apparatus 204, offline-processing apparatus 208, presentation apparatus 206, data repository 134, and/or offline data store 234 may be provided by a single physical machine, multiple computer systems, one or more virtual machines, a grid, one or more databases, one or more filesystems, and/or a cloud computing system. Query-processing apparatus 204, presentation apparatus 206, and offline-processing apparatus 208 may additionally be implemented together and/or separately by one or more hardware and/or software components and/or layers.

Second, a number of machine learning models 208 and/or techniques may be used to generate scores 210 and 226. For example, the functionality of each machine learning model may be provided by a regression model, artificial neural network, support vector machine, decision tree, naïve Bayes classifier, Bayesian network, clustering technique, collaborative filtering technique, deep learning model, hierarchical model, and/or ensemble model. The retraining or execution of each machine learning model may also be performed on an offline, online, and/or on-demand basis to accommodate requirements or limitations associated with the processing, performance, or scalability of the system and/or the availability of features 224 and outcomes used to train the machine learning model. Multiple versions of a machine learning model may further be adapted to different subsets of members and/or opportunities (e.g., different member segments in the community), or the same machine learning model may be used to generate scores 210 and 226 for all members and/or all active job seekers in the community.

Third, the system of FIG. 2 may be adapted to estimate quantiles 218 and/or generate results 220 related to rankings of candidates 116 for various types of opportunities. For example, the functionality of the system may be used to improve response rates and/or applications related to academic positions, artistic or musical roles, school admissions, fellowships, scholarships, competitions, club or group memberships, matchmaking, recommendations, follows, and/or other types of opportunities.

Figure 3A:
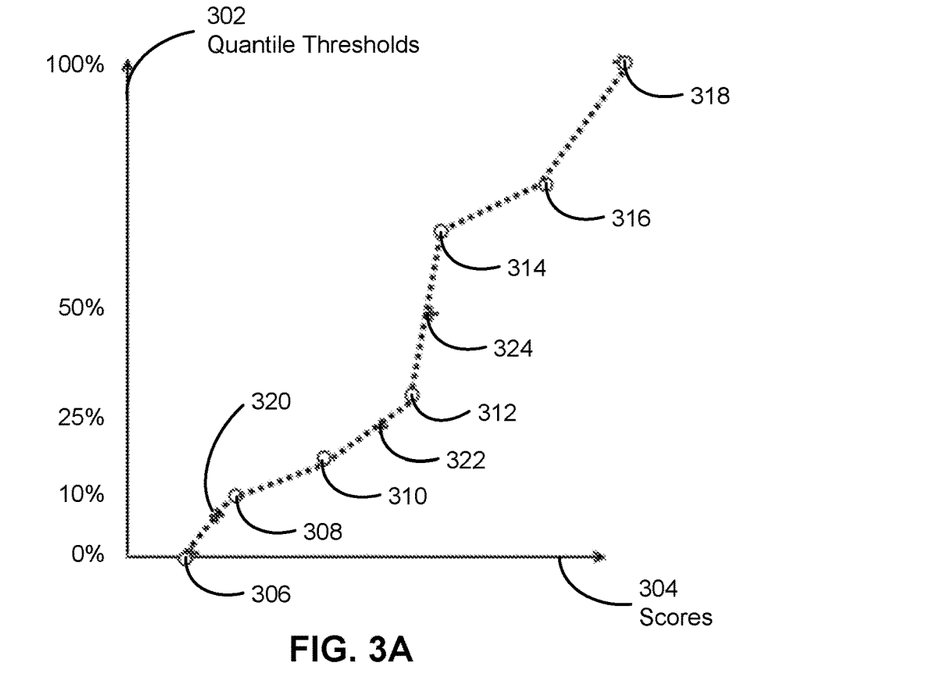
FIG. 3A shows an example plot in accordance with the disclosed embodiments.

FIG. 3A shows an example plot in accordance with the disclosed embodiments. More specifically, FIG. 3A shows a plot of quantile thresholds 302 as a function of scores 304 outputted by a machine learning model, such as machine learning models 208 of FIG. 2. The plot of FIG. 3A includes a number of points 306-318 representing scores 304 of candidates in a ranking. For example, points 306-318 may include all scores 304 generated for the candidates, or points 306-318 may be sampled and/or selected from all available scores for the candidates.

In turn, points 306-318 are used to identify and/or calculate additional points 320-324 representing quantile thresholds 302 for the ranking. Point 306 represents the lowest score and is set as the 0% quantile threshold for the distribution. Point 318 represents the highest score and is set as the 100% quantile threshold for the distribution. Points 306-318 may then be used to identify and/or calculate points 320-324 representing the remaining quantile thresholds 302 of 10%, 25%, and 50% for the distribution. For example, point 320 may represent the 10% quantile threshold, which falls between the two lowest points 306 and 308 in the ranking. Point 322 may represent the 25% quantile threshold, which falls between the third and fourth lowest points 310 and 312 in the ranking. Point 324 may represent the 50% quantile threshold, which falls halfway between the lowest and highest points 306 and 318 in the ranking.

Figure 3B:
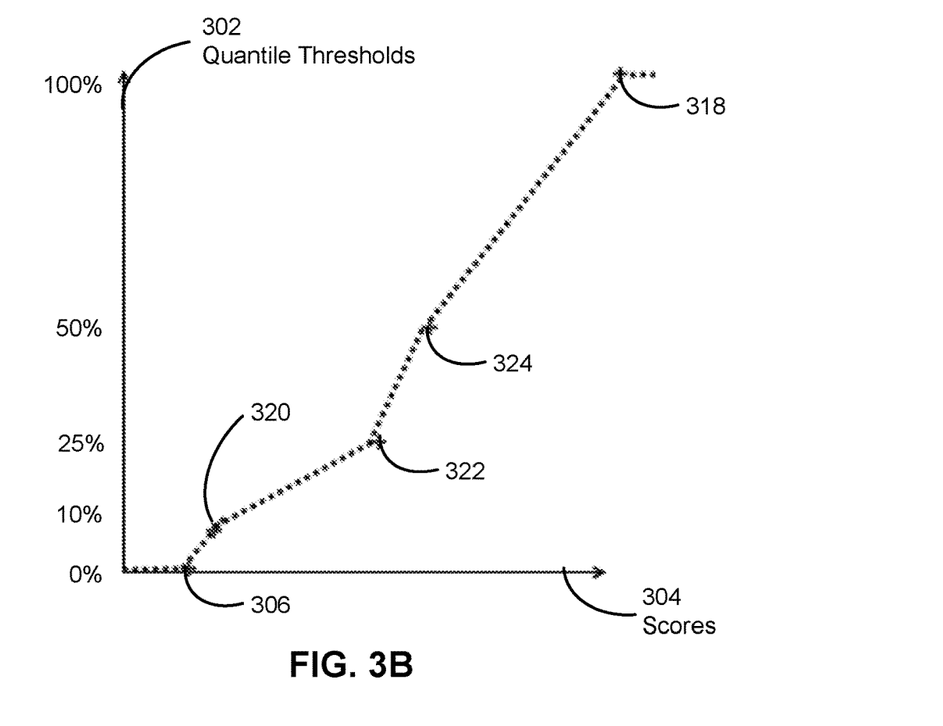
FIG. 3B shows an example plot in accordance with the disclosed embodiments.

In turn, a fixed number of quantile thresholds 302 may be used to estimate quantiles of additional scores, in lieu of using scores represented by a variable and/or larger number of points 306-318. As shown in FIG. 3B, points 306, 320, 322, 324, and 318 are stored as quantile thresholds 302 of 0%, 10%, 25%, 50%, and 100%, respectively. In turn, the plot of FIG. 3B may be used to estimate the percentile associated with a recently calculated score for a candidate.

For example, a score that is lower than the score represented by point 306 may be assigned to the $0^{th}$ percentile, and a score that is higher than the score represented by point 318 may be assigned to the $100^{th}$ percentile. A score that is between points 306 and 320 may have a percentile that is interpolated to be between 0 and 10, and a score that is between points 320 and 322 may have a percentile that is interpolated to be between 10 and 25. A score that is between points 322 and 324 may have a percentile that is interpolated to be between 25 and 50, and a score that is between points 324 and 326 may have a percentile that is interpolated to be between 50 and 100.

As described above, quantile thresholds 302 may be fixed and/or selected to accommodate subsequent usage of the scores. For example, quantile thresholds 302 may include more values between the $0^{th}$ and $50^{th}$ percentiles than between the $50^{th}$ and $100^{th}$ percentiles to allow for more fine-grained interpolation of percentiles for scores that are between the $0^{th}$ percentile and the $50^{th}$ percentile than between the $50^{th}$ percentile and the $100^{th}$ percentile. In turn, the interpolated percentiles may produce more accurate rankings, recommendations, and/or insights for scores that are between the $0^{th}$ percentile and $50^{th}$ percentiles than for scores that are between the $50^{th}$ and $100^{th}$ percentiles.

Figure 4:
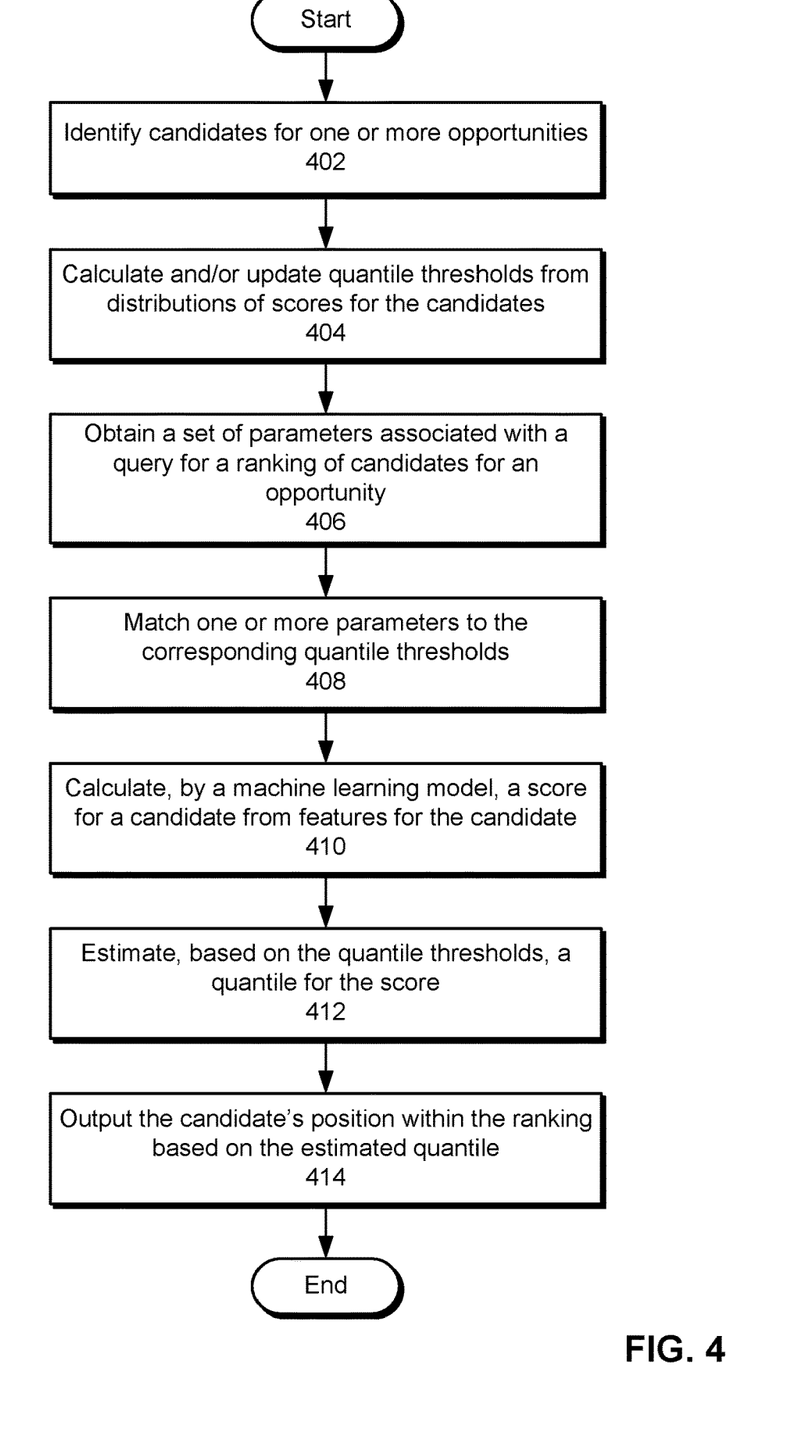
FIG. 4 shows a flowchart illustrating a process of estimating percentiles for applicant rankings in accordance with the disclosed embodiments.

FIG. 4 shows a flowchart illustrating a process of estimating percentiles for applicant rankings in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, candidates for one or more opportunities are identified (operation 402). For example, each opportunity may represent a job, role, position, fellowship, scholarship, and/or award. As a result, the candidates may include users who have applied to the opportunity, viewed the opportunity, searched for the opportunity, and/or been identified as qualified for the opportunity. In another example, the candidates may include potential connection recommendations for a member of an online network. In a third example, the candidates may be identified using a set of rules that are applied to attributes of the candidates.

Next, quantile thresholds are calculated and/or updated from distributions of scores for the candidates (operation 404). For example, the quantile thresholds may represent a pre-specified number of fixed quantiles and/or quantiles that are selected for a given machine learning model and/or use case for a set of scores. In turn, some or all available scores associated with the candidates and opportunity may be ordered and used to calculate score values representing the quantile thresholds. Operations 402-404 may be repeated to update the quantile thresholds on a periodic basis and/or based on the availability of data that can be used to update the quantile thresholds.

A set of parameters associated with a query for a ranking of candidates for an opportunity is obtained (operation 406), and one or more of the parameters are matched to the corresponding quantile thresholds (operation 408). For example, the query may include parameters such as a candidate, an opportunity, and/or a ranking category (e.g., overall ranking, skills-based ranking, ranking based on previous positions of the candidate, ranking based on a current position of the candidate, etc.) for which the ranking is to be generated. The opportunity and/or ranking category may then be used to retrieve quantile thresholds calculated in operations 402-404 for the corresponding distribution of scores.

A score for the candidate is also calculated by a machine learning model from features for the candidate (operation 410). For example, up-to-date features for the candidate may be retrieved from an online and/or nearline data store, and the machine learning model may be applied to the features to produce an "online" score for the candidate that reflects the candidate's latest activity and/or profile updates.

A quantile for the score is estimated based on the quantile thresholds (operation 412). For example, an interpolation technique (e.g., linear interpolation, spline interpolation, multivariate interpolation, etc.) may be used to estimate the score's percentile in the distribution based on the value of the score, values of two consecutive quantile thresholds within which the score lies, and quantiles represented by the consecutive quantile thresholds.

Finally, the candidate's position within the ranking is outputted based on the estimated quantile (operation 414). For example, the estimated quantile may be used as the candidate's relative position in the ranking and/or to estimate the candidate's numeric position in the ranking (e.g., by multiplying the quantile by the total number of candidates in the ranking). The position, percentile, and/or related insights (e.g., "You are in the top 10% of candidates for this job," "You are in the top 10 candidates for this job," etc.) may then be included in a job viewed by the candidates, a job recommended to the candidate, a job in search results for the candidate's job search, and/or a recommendation of the candidate to a recruiter, human resources professional, and/or other moderator involved in placing the job.

Figure 5:
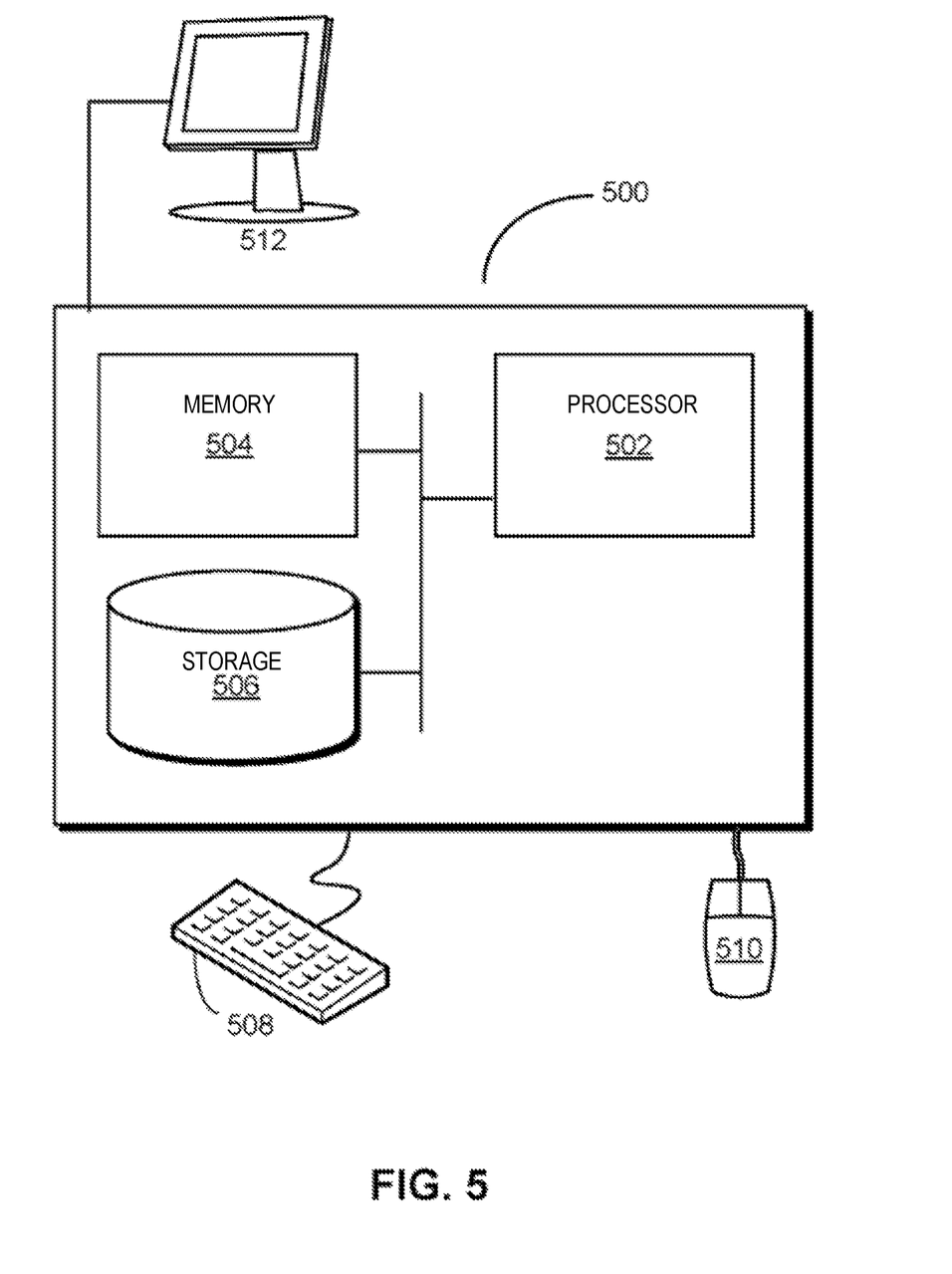
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing a query for a ranking of candidates for an opportunity. The system includes a query-processing apparatus and a presentation apparatus, one or more of which may alternatively be termed or implemented as a module, mechanism, or other type of system component. The query-processing apparatus obtains parameters associated with a query for a ranking of candidates for an opportunity. Next, the query-processing apparatus matches one or more of the parameters to a fixed number of quantile thresholds calculated from a distribution of scores for the candidates. The query-processing apparatus then estimates, based on the quantile thresholds, a quantile for a score of the candidate. Finally, the presentation apparatus outputs a position of the candidate within the ranking based on the estimated quantile.

In addition, one or more components of computer system 500 may be remotely located and connected to the other components over a network. Portions of the present embodiments (e.g., query-processing apparatus, presentation apparatus, offline-processing apparatus, online network, etc.) may also be located on different nodes of a distributed system that implements the embodiments. For example, the present embodiments may be implemented using a cloud computing system that processes queries for rankings of a set of remote candidates for opportunities.

By configuring privacy controls or settings as they desire, members of a social network, online professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method comprising:
gathering historical feedback data describing previously executed search queries, the previously executed search queries being executed in relation to previously available opportunities, the historical feedback data including profile feature data describing profiles returned as search results to the previously executed search queries, opportunity feature data describing the previously available opportunities, as well as interaction feature data describing interaction with the profiles returned as search results to the previously executed search queries;
generating a machine learning model based on the historical feedback data, the machine learning model configured to output a probability score indicating a strength of a candidate for a target opportunity based on input of profile feature data describing a respective profile of the candidate and opportunity feature data describing the target opportunity;
obtaining parameters associated with a query for a ranking of candidates for a specified opportunity, wherein the parameters comprise data identifying at least a first candidate and the specified opportunity;
generating an input based on profile feature data describing a profile of the first candidate and opportunity feature data describing the specified opportunity;
providing the input into the machine learning model, yielding a probability score indicating a strength of the first candidate for the specified opportunity;
obtaining a fixed number of quantile thresholds associated with the parameters, the fixed number of quantile thresholds previously calculated from a distribution of probability scores for the candidates;
using the obtained quantile thresholds and the first probability score, performing an interpolation technique to derive an estimated quantile for the first probability score;
and presenting, via a user interface, the estimated quantile for the first probability score indicating a position of the first candidate within the ranking.

2. The method of claim 1, further comprising:
identifying the candidates for the specified opportunity; and
updating the fixed number of quantile thresholds from the distribution of probability scores for the candidates.

3. The method of claim 2, wherein the candidates for the specified opportunity are identified based on determining that a user has viewed the specified opportunity or applied to the specified opportunity.

4. The method of claim 2, wherein the candidates for the specified opportunity are identified based on at least one of: profile data identifying qualifications of a user for the specified opportunity and a set of rules.

5. The method of claim 1, further comprising:
calculating score values representing a set of fixed quantiles in the distribution of probability scores;
calculating the fixed number of quantile thresholds based on the score values representing the set of fixed quantiles.

6. The method of claim 1, further comprising:
selecting a set of quantiles for the machine learning model used to produce the probability scores for the candidates; and
calculating score values representing the set of quantiles in the distribution of probability scores.

7. The method of claim 1, wherein the ranking is associated with at least one of:
a job view;
a job recommendation;
a candidate recommendation;
a connection recommendation; and
a job search.

8. The method of claim 1, wherein the parameters further comprise a ranking category.

9. The method of claim 8, wherein the ranking category is at least one of:
an overall ranking;
a skills-based ranking;
a ranking based on previous positions of the candidates; and
a ranking based on a current position of the candidates.

10. A system comprising:
one or more computer processors; and
one or more computer readable mediums storing instructions that, when executed by the one or more computer processors, cause the system to perform operations comprising:
gathering historical feedback data describing previously executed search queries, the previously executed search queries being executed in relation to previously available opportunities, the historical feedback data including profile feature data describing profiles returned as search results to the previously executed search queries, opportunity feature data describing the previously available opportunities, as well as interaction feature data describing interaction with the profiles returned as search results to the previously executed search queries;
generating a machine learning model based on the historical feedback data, the machine learning model configured to output a probability score indicating a strength of a candidate for a target opportunity based on input of profile feature data describing a respective profile of the input candidate and opportunity feature data describing the target opportunity;
obtaining parameters associated with a query for a ranking of candidates for a first specified opportunity, wherein the parameters comprise data identifying at least a first candidate and the specified opportunity;
generating an input based on profile feature data describing a profile of the first candidate and opportunity feature data describing the specified opportunity;
providing the input into the machine learning model, yielding a probability score indicating a strength of the first candidate for the specified opportunity;
obtaining a fixed number of quantile thresholds associated with the parameters, the fixed number of quantile thresholds previously calculated from a distribution of probability scores for the candidates;

using the obtained quantile thresholds and the first probability score, performing an interpolation technique to derive an estimated quantile for the first probability score; and presenting, via a user interface, the estimated quantile for the first probability score indicating a position of the first candidate within the ranking.

11. The system of claim 10, the operations further comprising:

identifying the candidates for the specified opportunity; and updating the fixed number of quantile thresholds from the distribution of probability scores for the candidates.

12. The system of claim 11, wherein the candidates for the specified opportunity are identified based on determining that a user has viewed the specified opportunity or applied to the opportunity.

13. The system of claim 11, wherein the candidates for the specified opportunity are identified based on at least one of profile data identifying qualifications of a user for the specified opportunity and a set of rules.

14. The system of claim 10, the operations further comprising:

calculating score values representing a set of fixed quantiles in the distribution of probability scores;

calculating the fixed number of quantile thresholds based on the score values representing the set of fixed quantiles.

15. The system of claim 10, the operations further comprising:

selecting a set of quantiles for the machine learning model used to produce the probability scores for the candidates; and calculating score values representing the set of quantiles in the distribution of probability scores.

16. The system of claim 10, wherein the ranking is associated with at least one of:
a job view;
a job recommendation;
a candidate recommendation;
a connection recommendation; and
a job search.

17. The system of claim 10, wherein the parameters further comprise a ranking category selected from at least one of:
an overall ranking;
a skills-based ranking;
a ranking based on previous positions of the candidates; and
a ranking based on a current position of the candidates.

18. A non-transitory computer readable medium storing instructions that, when executed by one or more computer processors of one or more computing devices, cause the one or more computing devices to perform operations comprising:

gathering historical feedback data describing previously executed search queries, the previously executed search queries being executed in relation to previously available opportunities, the historical feedback data including profile feature data describing profiles returned as search results to the previously executed search queries, opportunity feature data describing the previously available opportunities, as well as interaction feature data describing interaction with the profiles returned as search results to the previously executed search queries;

generating a machine learning model based on the historical feedback data, the machine learning model configured to output a probability score indicating a strength of a candidate for a target opportunity based on input of profile feature data describing a respective profile of the input candidate and opportunity feature data describing the target opportunity;

obtaining parameters associated with a query for a ranking of candidates for a specified opportunity, wherein the parameters comprise data identifying at least a first candidate and the specified opportunity;

generating an input based on profile feature data describing a profile of the first candidate and opportunity feature data describing the specified opportunity;

providing the input into the machine learning model, yielding a probability score indicating a strength of the first candidate for the specified opportunity;

obtaining a fixed number of quantile thresholds associated with the parameters, the fixed number of quantile thresholds previously calculated from a distribution of probability scores for the candidates;

using the obtained quantile thresholds and the first probability score, performing an interpolation technique to derive an estimated quantile for the first probability score; and presenting, via a user interface, the estimated quantile for the first probability score indicating a position of the first candidate within the ranking.

* * * * *

UNITED STATES PATENT AND TRADEMARK OFFICE
CERTIFICATE OF CORRECTION

| | | |
|---|---|---|
| PATENT NO. | : 11,386,365 B2 | Page 1 of 1 |
| APPLICATION NO. | : 16/144012 | |
| DATED | : July 12, 2022 | |
| INVENTOR(S) | : Sachdev et al. | |

It is certified that error appears in the above-identified patent and that said Letters Patent is hereby corrected as shown below:

In the Claims

In Column 13, Line 51, in Claim 1, delete "score;" and insert --score; and-- therefor In Column 13, Line 52, in Claim 1, before "presenting,", delete "and"

In Column 16, Line 26, in Claim 18, after "a", insert --first--

Signed and Sealed this
Fourth Day of April, 2023

*Katherine Kelly Vidal*

Katherine Kelly Vidal
*Director of the United States Patent and Trademark Office*